United States Patent
Burkholder

(10) Patent No.: US 11,541,958 B2
(45) Date of Patent: Jan. 3, 2023

(54) STEERING COLUMN CLAMP

(71) Applicant: NEUTRON HOLDINGS, INC., San Francisco, CA (US)

(72) Inventor: Abram Burkholder, San Francisco, CA (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 155 days.

(21) Appl. No.: 16/875,518

(22) Filed: May 15, 2020

(65) Prior Publication Data

US 2020/0361561 A1   Nov. 19, 2020

Related U.S. Application Data

(60) Provisional application No. 62/848,400, filed on May 15, 2019.

(51) Int. Cl.
*B62K 21/12* (2006.01)
*B62K 21/18* (2006.01)
(Continued)

(52) U.S. Cl.
CPC .............. *B62K 21/24* (2013.01); *B62K 3/002* (2013.01); *B62K 21/12* (2013.01); *F16B 2/065* (2013.01); *B62K 2202/00* (2013.01)

(58) Field of Classification Search
CPC ........ B62K 3/002; B62K 21/12; B62K 21/18; B62K 21/22; B62K 21/24; B62K 2202/00; F16B 2/065
See application file for complete search history.

(56) References Cited

U.S. PATENT DOCUMENTS 5,193,930 A * 3/1993 Chi .................. B62K 21/12
403/24
8,123,242 B2 * 2/2012 Teal .................. B62K 3/002
280/221

(Continued)

FOREIGN PATENT DOCUMENTS

DE         19837972 B4 *   6/2005 ............. B62K 21/16
DE   202019102840 U1 *   6/2019 ............. B62K 21/22
(Continued)

OTHER PUBLICATIONS

Machine translation of KR 200384082 Y1 obtained on Jan. 10, 2022.*

*Primary Examiner* — Adam D Rogers
(74) *Attorney, Agent, or Firm* — Dentons US LLP

(57) ABSTRACT

Systems and methods directed to a steering column clamp for securing a steering column to a steerer tube are provided. The steering column clamp may include an internal clamp portion having longitudinal slot disposed at least partially between a first end of the internal clamp portion and a second end of the internal clamp portion. The steering column clamp may include a tightening mechanism, when engaged, causes the internal clamp portion to compress about a steerer tube placed in a first end of the internal clamp portion. The steering column claim may also include an exterior wall portion at least partially enclosing the internal clamp portion such that a hollow portion is between the internal clamp portion and an internal surface of the exterior wall portion of the steering column clamp.

11 Claims, 8 Drawing Sheets

(51) Int. Cl.
*F16B 2/02* (2006.01)
*B62K 21/24* (2006.01)
*B62K 3/00* (2006.01)
*F16B 2/06* (2006.01)

(56) References Cited

U.S. PATENT DOCUMENTS

| 10,926,827 | B2 * | 2/2021 | Susse | B62K 19/32 |
| 2009/0057505 | A1 * | 3/2009 | Chen | F16M 11/28 |
| | | | | 248/185.1 |

FOREIGN PATENT DOCUMENTS

| EP | 1526065 | A1 | * | 4/2005 | ............. B62K 21/18 |
| GB | 2360260 | A | * | 9/2001 | ............. B62K 21/22 |
| KR | 200196529 | Y1 | * | 9/2000 | |
| KR | 200299060 | Y1 | * | 1/2003 | |
| KR | 200384082 | Y1 | * | 5/2005 | ........... B62K 13/025 |
| KR | 20150086810 | A | * | 7/2015 | ............. B62K 21/22 |

* cited by examiner

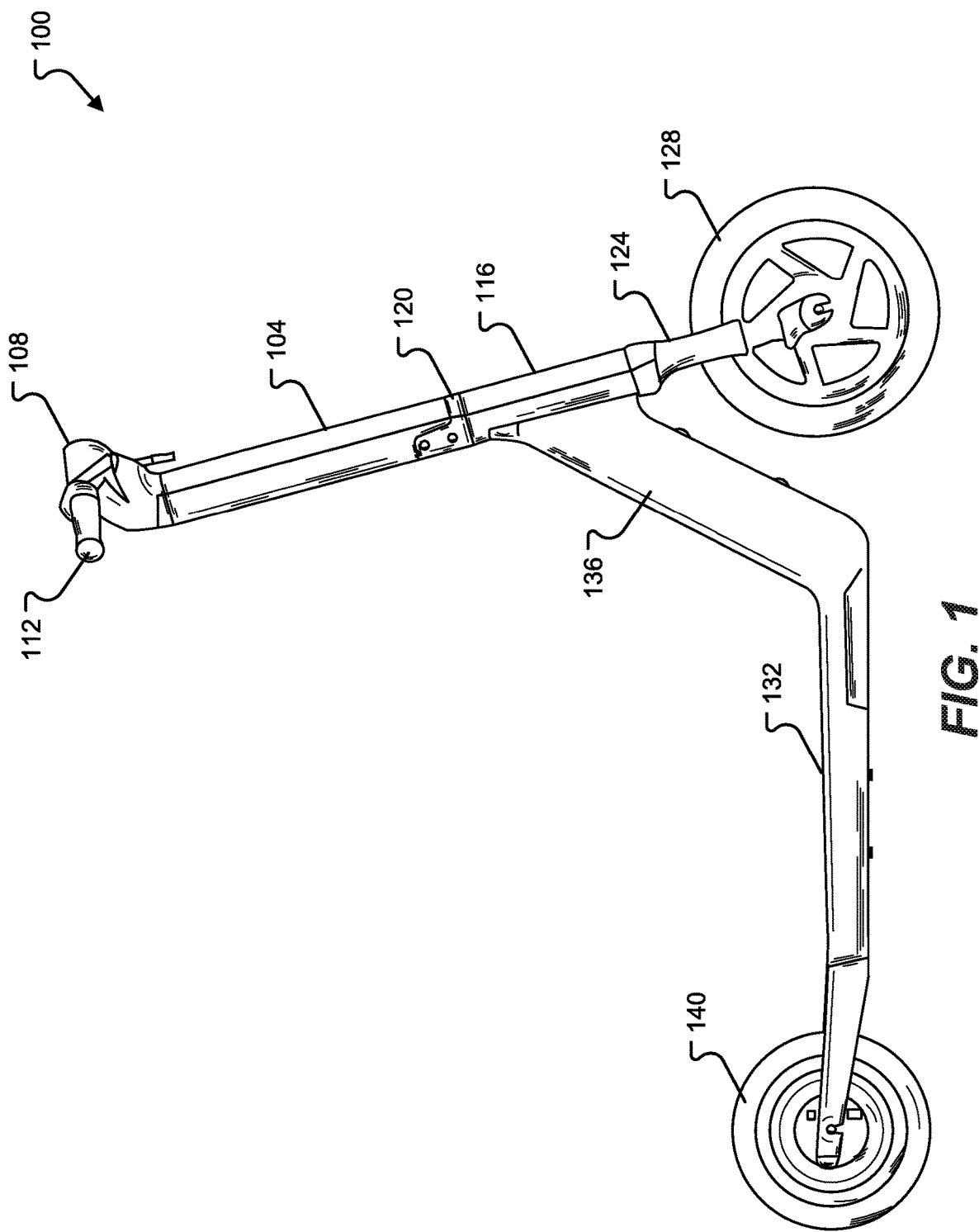

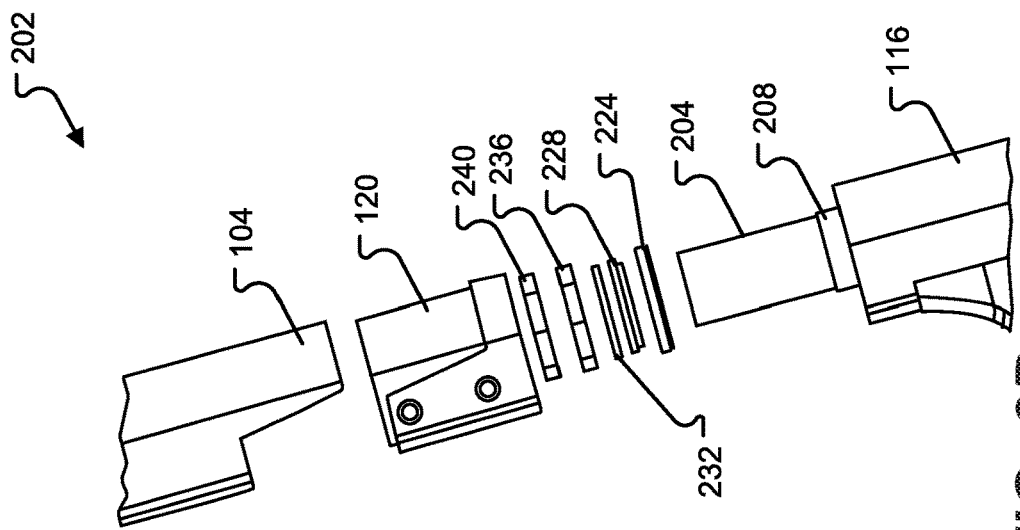
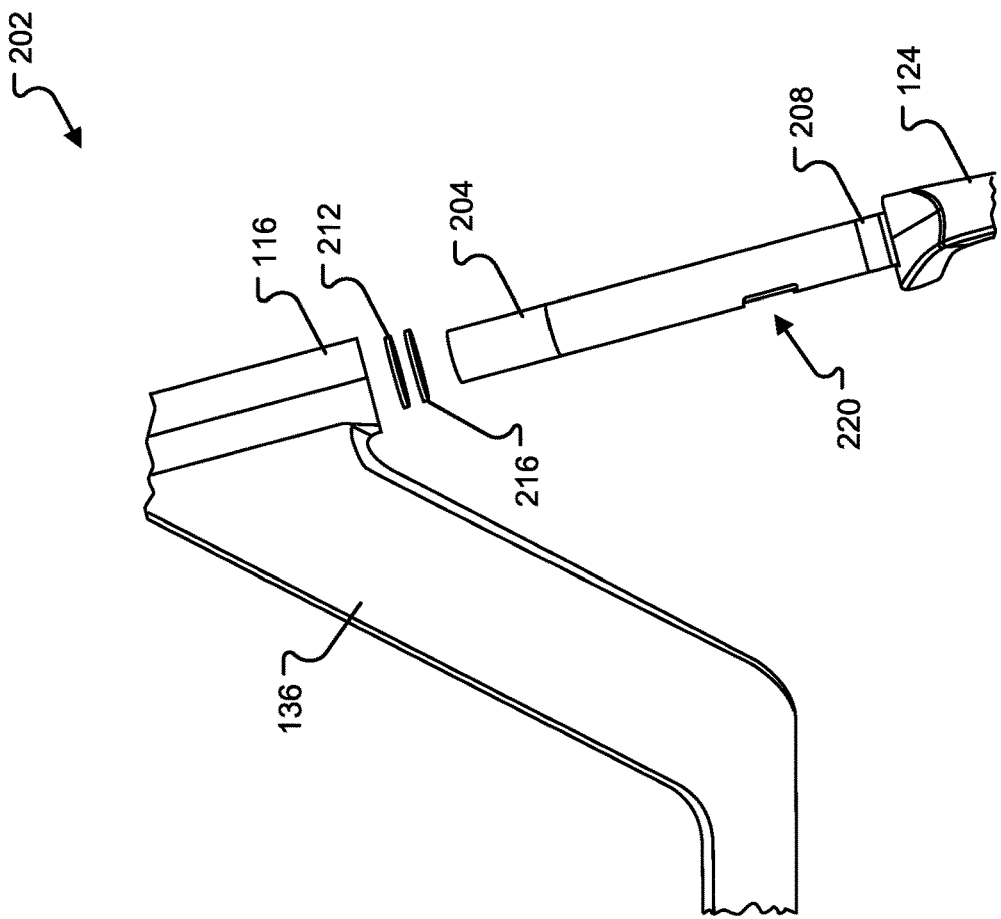

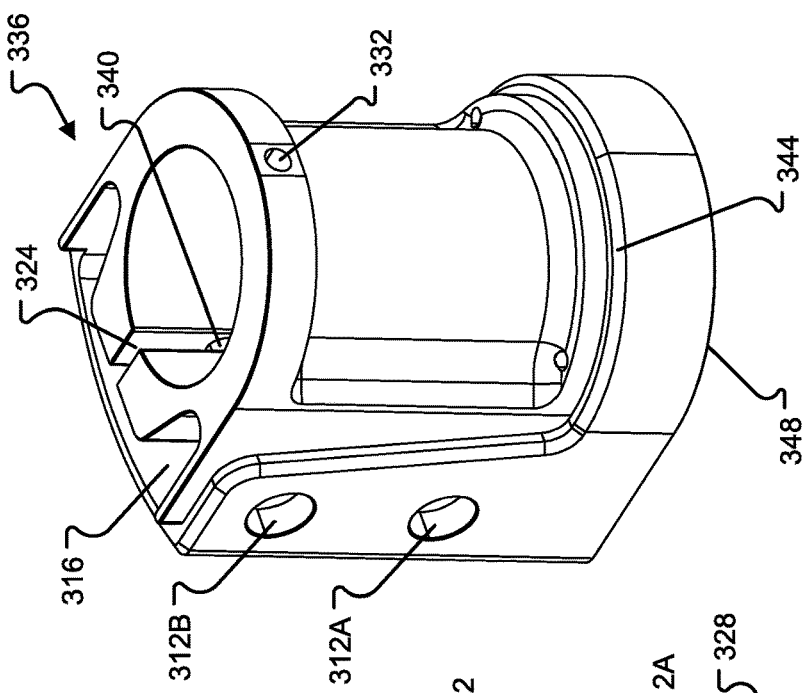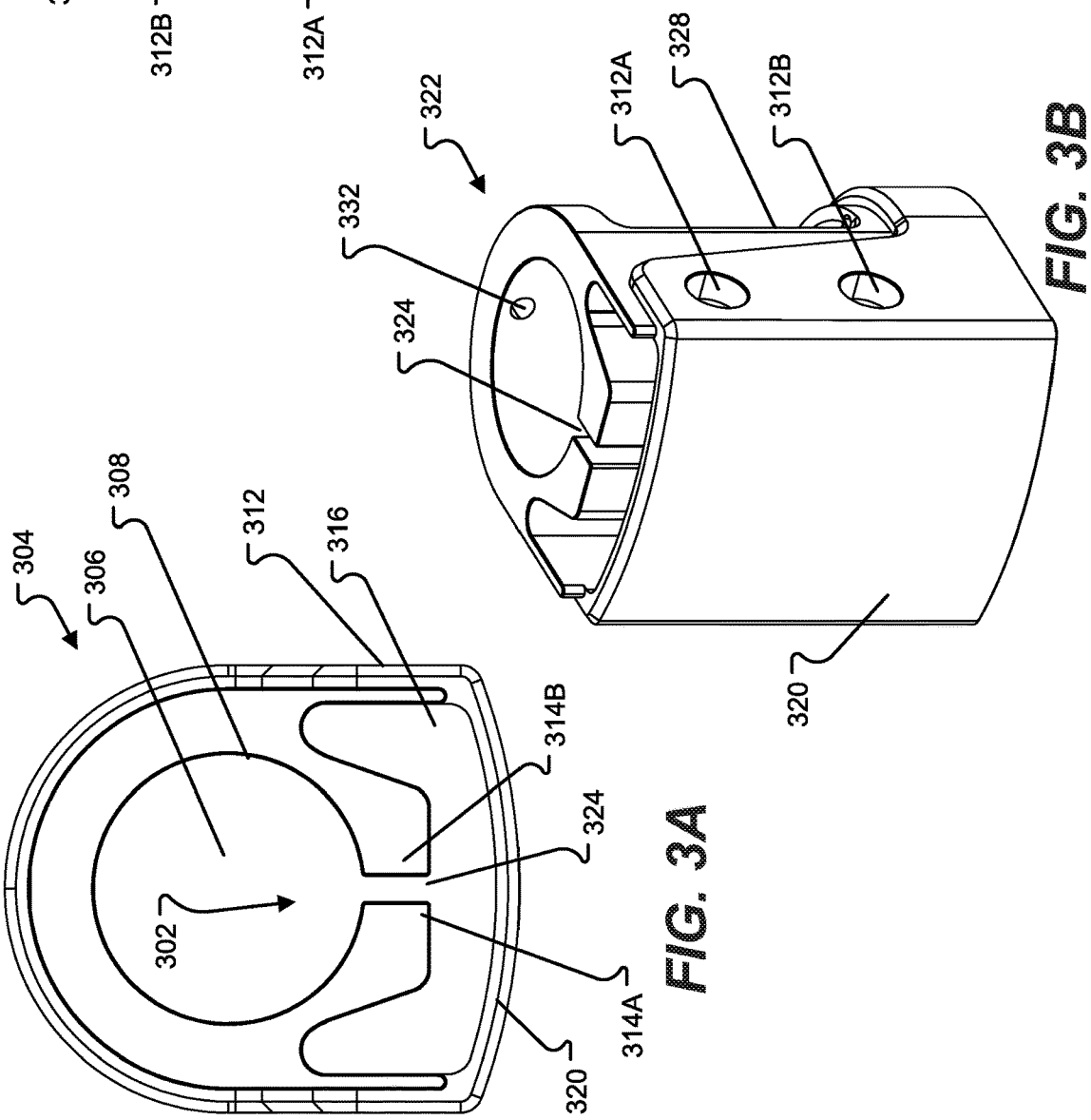

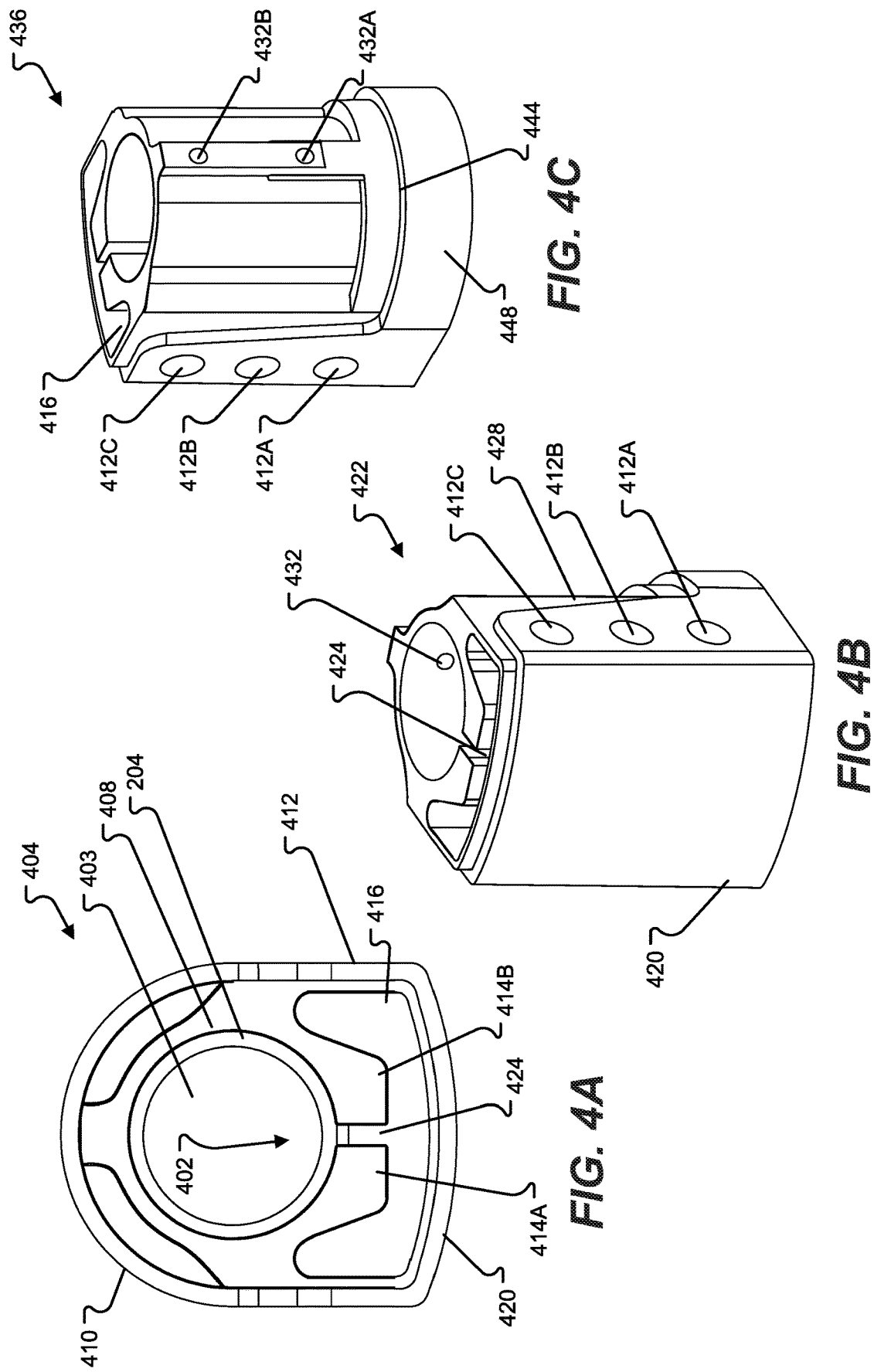

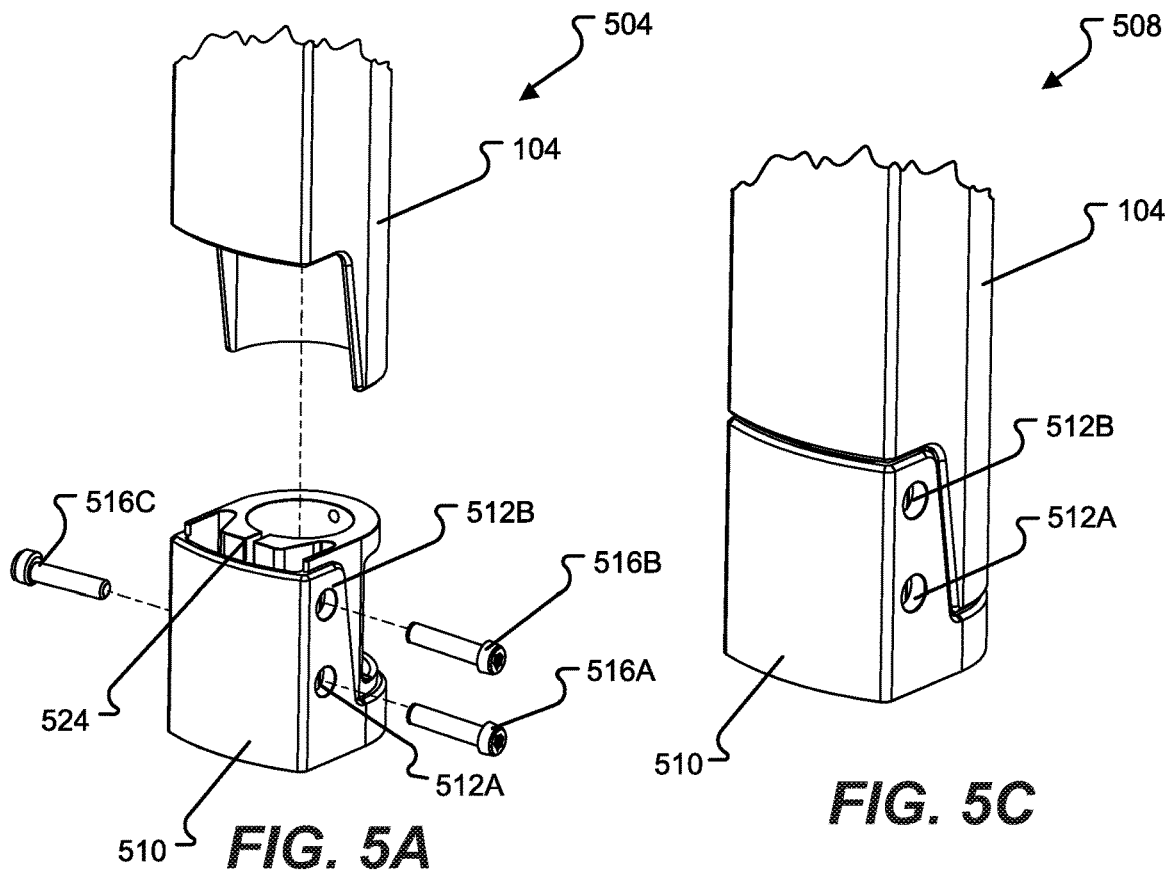
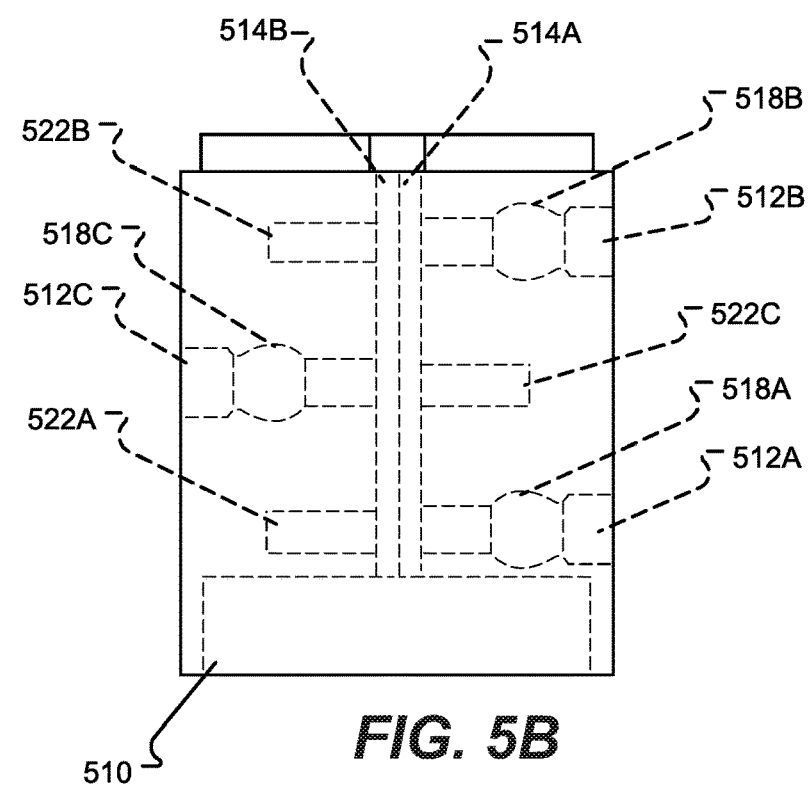
*FIG. 5A*
*FIG. 5C*
*FIG. 5B*

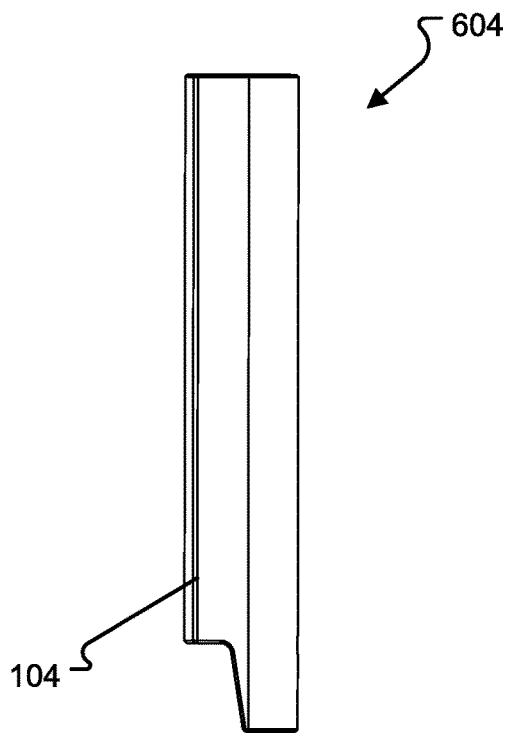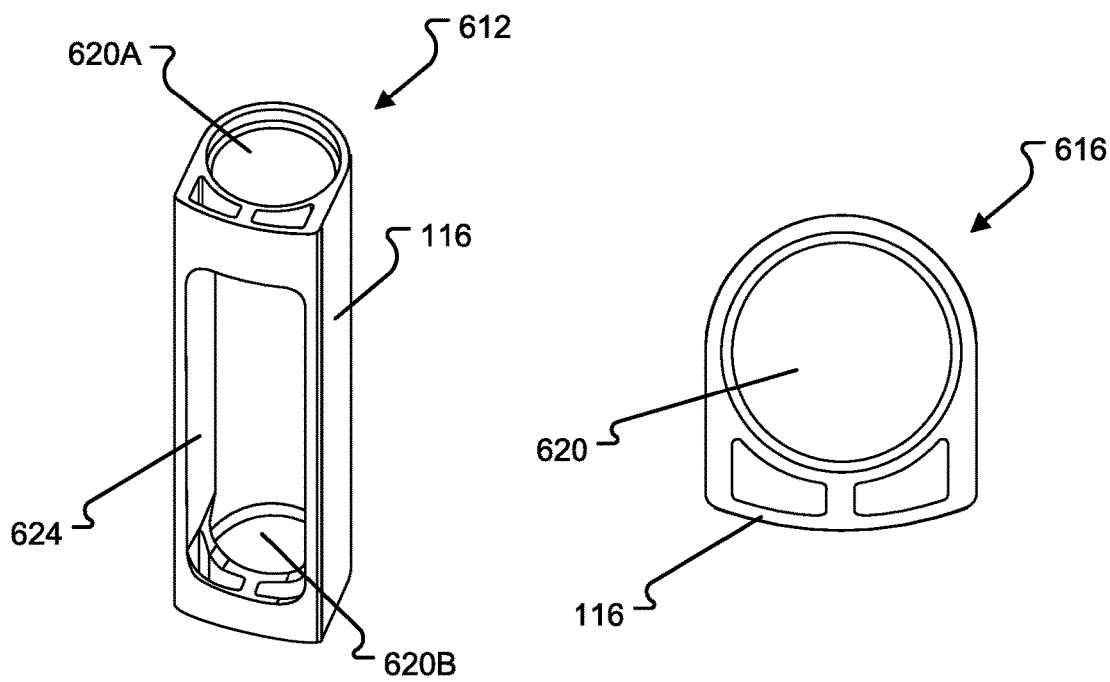
FIG. 6A   FIG. 6B
FIG. 6C   FIG. 6D

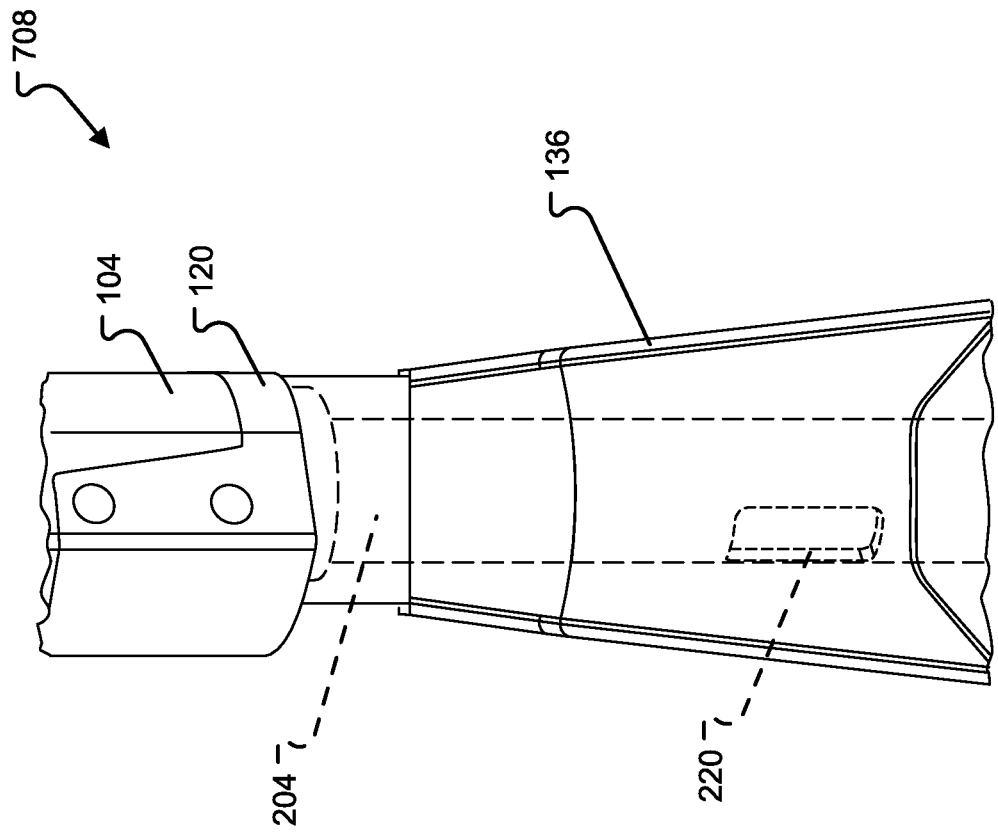
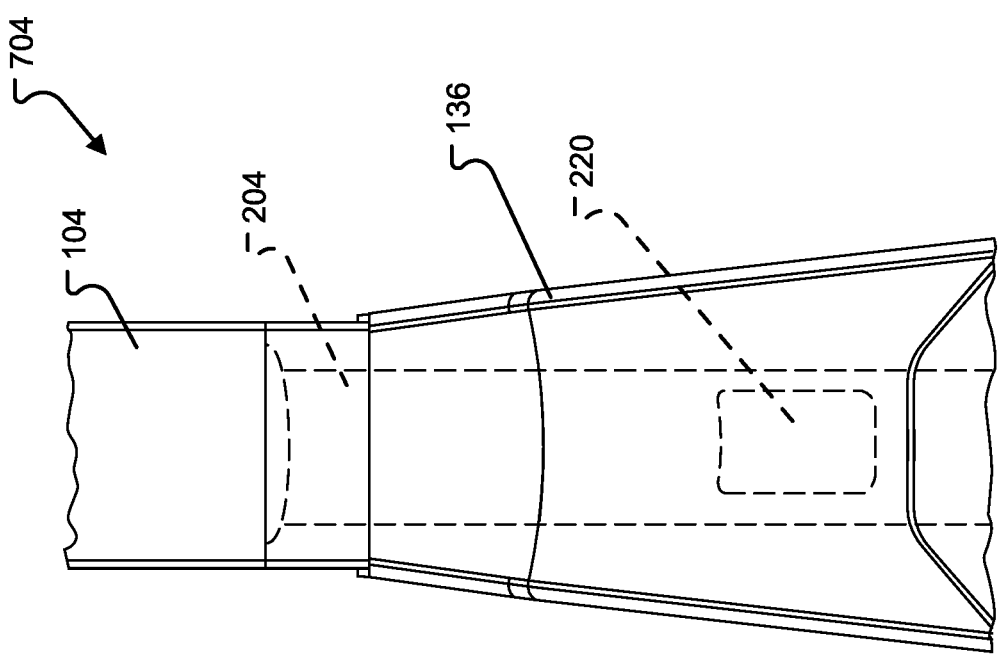
FIG. 7B
FIG. 7A

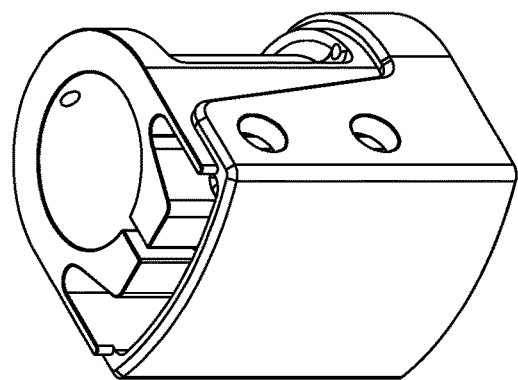
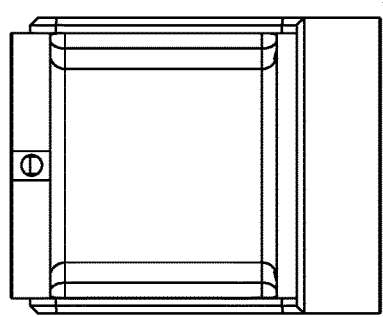
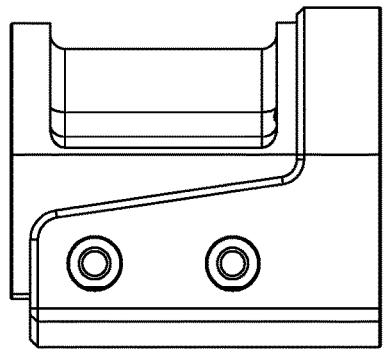
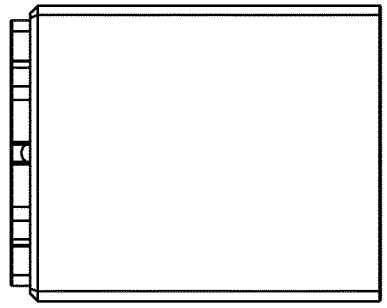
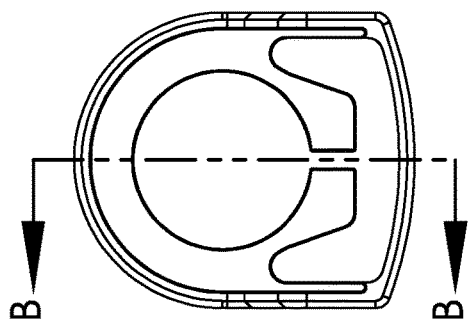
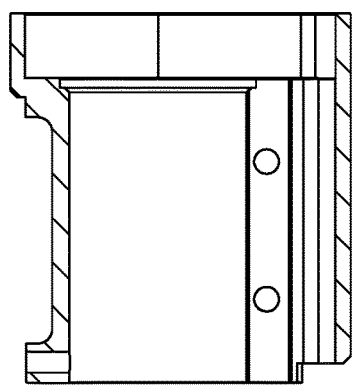
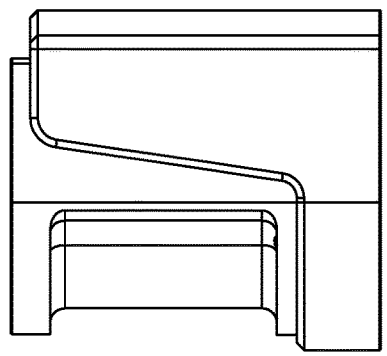
SECTION B-B
FIG. 8

STEERING COLUMN CLAMP

CROSS-REFERENCE TO RELATED APPLICATION

This application claims priority to U.S. Provisional Application No. 62/848,400 entitled "Steering Column Clamp", filed on May 15, 2019, the entire disclosure of which is hereby incorporated by reference in its entirety.

BACKGROUND

Shared personal mobility devices have become a popular mode of transportation. For instance, two-wheeled motorized scooters can be rented from a first location and returned to a different second location. To maximize rental use as well as usability, shared personal mobility devices are often placed in areas exposed to various outdoor elements, such as rain, snow, and sun, and are often located in areas of high use. While most shared personal mobility devices are built to withstand the kind of wear and tear experienced by commercial users and caused due to exposure to the elements, the shared personal mobility devices may be subjected to damage, whether intentional or not, that may require repair. Accordingly, components of the shared personal mobility devices are often designed to be repairable, replaceable, and reusable among other shared personnel mobility devices.

SUMMARY

Components of a motorized scooter that tend to be subjected to and exposed to harsh weather elements include a handlebar assembly, a steering column, and steering column clamp. The steering column clamp generally couples the steering column to the steerer tube, where the steerer tube is connected to a front wheel assembly. The handlebar assembly is typically positioned at the top of the steering column. Most handlebar assemblies are utilized to translate a force applied to one or both handlebars to a steerer tube in order to cause the front wheel of the motorized scooter to pivot when turning for example. In some instances, the front wheel may need to be replaced, repaired, and/or assembled which often requires the removal of a steerer tube. However, because external circular clamps or sleeves are often utilized to clamp a portion of a steering column to the steerer tube, too much force applied to the clamp may cause deformation of the steerer tube. Accordingly, when trying to remove the steerer tube, the steerer tube may be deformed in such a manner that the steerer tube is either unrepairable, not reusable, or is deformed in such a manner that separating it from another component of the scooter is impracticable. Moreover, as most clamps or sleeves utilize components exposed to the rain, sun, and snow, some clamp components may become brittle, may break, and/or may no longer perform their intended function.

Accordingly, the present disclosure describes a steering column and steering column clamp, where the steering column clamp includes an inner clamp portion that is shielded from weather elements. Moreover, the steering clamp may include one or more portions that reduce, or otherwise prevent the inner clamp portion from crushing or otherwise causing deformation of the steerer tube. The steering column clamp may be configured to mate with an opening at a first end of the steering column, such that the steering column clamp is fixedly attached to the steering column; similarly, the handlebar assembly including one or more handlebars may be fixedly attached to the steering column. Therefore, an assembled steering column having the handlebar assembly and the steering column clamp for clamping to or otherwise securing the steering column to the steerer tube may be provided as a single piece for replacing, shipping, and/or repairing.

In accordance with at least one example of the present disclosure, a steering column clamp is provided. The steering column clamp may include an internal clamp portion having a longitudinal slot disposed at least partially between a first end of the internal clamp portion and a second end of the internal clamp portion. A tightening mechanism, when engaged, causes the internal clamp portion to compress about a steerer tube placed in a first end of the internal clamp portion. The steering column clamp may further include an exterior wall portion at least partially enclosing the internal clamp portion such that a hollow portion is between the internal clamp portion and an internal surface of the exterior wall portion of the steering column clamp.

In accordance with another example of the present disclosure, a scooter steering assembly is provided. The scooter steering assembly may include a handlebar assembly having one or more handlebars, a steering column clamp having an internal clamp portion, and a steering column disposed between the handlebar assembly and a first end of the steering column clamp. In some examples, a tightening mechanism, when engaged, causes the internal clamp portion to compress about a steerer tube.

In accordance with another example of the present disclosure, a method of securing a handlebar assembly is provided. The method may include fixedly attaching a first end of a steering column clamp to an opening at a first end of a steering column tube. A tightening mechanism, when engaged, causes the internal clamp portion to compress about a steerer tube. Further, the method may include attaching a second end of the steering column tube to the handlebar assembly.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 1 illustrates a scooter in accordance with examples of the present disclosure.

FIG. 2A illustrates a first portion of a compression in accordance with examples of the present disclosure.

FIG. 2B illustrates a second portion of a compression in accordance with examples of the present disclosure.

FIG. 3A depicts a top perspective view of a first example steering column clamp in accordance with examples of the present disclosure.

FIG. 3B depicts rear perspective view of the first example steering column clamp in accordance with examples of the present disclosure.

FIG. 3C depicts a front perspective view of the first example steering column clamp in accordance with examples of the present disclosure.

FIG. 4A depicts a top perspective view of a second example column steering clamp in accordance with examples of the present disclosure.

FIG. 4B depicts a rear perspective view of the second example steering column clamp in accordance with examples of the present disclosure.

FIG. 4C depicts a front perspective view of the first example steering column clamp in accordance with examples of the present disclosure.

FIG. 5A depicts a perspective exploded view of a steering column and a third example of a steering column clamp in accordance with examples of the present disclosure.

FIG. 5B depicts a perspective assembled view of the steering column and the third example steering column clamp in accordance with examples of the present disclosure.

FIG. 5C depicts a front view of the third example steering column clamp in accordance with examples of the present disclosure.

FIG. 6A depicts a side view of the steering column in accordance with examples of the present disclosure.

FIG. 6B depicts a top view of the steering column in accordance with examples of the present disclosure.

FIG. 6C depicts a perspective view of a head tube in accordance with examples of the present disclosure.

FIG. 6D depicts a top view of the head tube in accordance with examples of the present disclosure.

FIG. 7A depicts a first front view of a head tube, neck, and steerer tube in accordance with examples of the present disclosure.

FIG. 7B depicts a second front view of a head tube, neck, and steerer tube in accordance with examples of the present disclosure.

FIG. 8 depicts a top, right side, left side, front, back, cross-section, and perspective view of the steering column in accordance with examples of the present disclosure.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

FIG. 1 depicts details of an example scooter 100 in accordance with examples of the present disclosure. More specifically, the scooter 100 may be a motorized or non-motorized type. The scooter 100 may generally include a handlebar assembly 108 attached to or otherwise coupled to a steering column 104. To control a direction of the scooter 100, and in some cases a balance of a rider, a rider may push or pull on the handlebar 112 thereby causing the handlebar assembly 108 to transfer a pivot motion to the front wheel assembly 128. The front wheel assembly may be coupled to a front fork assembly 124. Between the front wheel assembly 128 and the rear wheel assembly 140 is the deck assembly 132 where a rider may stand while riding the scooter 100. The deck assembly 132 may be the largest and heaviest part of the scooter 100. The deck assembly 132 is the main platform on which the entire scooter is built; in addition to the primary area of the deck (where a rider may put their feet), the deck assembly 132 may also include the head tube 116, which houses a steerer tube as will be shown in FIG. 2, and the neck 136 which supports the head tube 116. The rear U-shaped area of the deck where the rear wheel assembly 140 mounts near the brake is often referred to as the dropout.

The deck assembly 132 may be computer numerical controlled (CNC) machined from solid billet aluminum, extruded through a mold, and/or constructed using three-dimensional printing techniques for example. The deck assembly 132 may include a plurality of mixed parts, such as an extruded deck assembly 132 and neck 136 and a head tube 116 made from cast aluminum or another similar mix of manufacturing processes. The steering column 104 may be extruded from aluminum, steel, plastic, or other suitable material and attached to the handlebar assembly 108 and a steering column clamp 120. For example, the steering column 104 may be welded to the handlebar assembly 108 and/or the steering column clamp 120.

FIG. 2A depicts additional details of an example compression system 202 utilized to compress the head tube 116 to the neck 136 as well as attach the steering column clamp 120 to the steerer tube 204. The steerer tube 204 may be directly attached to the front fork assembly 124 and may include a threaded portion 208 that may (or may not) run the entire length of the steerer tube 204. The steerer tube 204 may be inserted into a hole, or pass-through, in the head tube 116 and extend through the head tube 116. In some instances, since the front fork assembly 124 and the steerer tube 204 rotate and/or pivot with respect to the head tube 116, a compression ring 216 and bearing 212 may be disposed between a lower surface of the head tube 116 and an upper surface of the front fork assembly 124 to facilitate rotation and reduce friction.

As depicted in FIG. 2B, one or more of a bearing 224, compression ring 228, and a spacer 232 may be disposed proximate to or between a first lock ring 240 and a second lock ring 236, where the first lock ring 240 and the second lock ring 236 may be threaded to the threaded portion 208 of the steerer tube 204. Although FIG. 2B illustrates the bearing 224, the compression ring 228, the spacer 232, the first lock ring 240 and the second lock ring 236 in a particular orientation, these components may be arranged in any order. For example, the bearing 224 may be positioned above the first lock ring 240 and a spacer 232 may be positioned between the first lock ring 240 and the second lock ring 236. The first lock ring 240 and the second lock ring 236 screw down on the steerer tube 204 and compress the fork assembly into the head tube 116. As further depicted in FIG. 2B, the steering column clamp 120 may clamp around the steerer tube 204 and may also be attached to the steering column 104. Similar to the front fork assembly 124 and the steerer tube 204, the steering column 104 and the steering column clamp 120 may rotate or pivot with respect to the head tube 116. Accordingly, a rotation of the steering column 104 may be translated to the steerer tube 204 and to the front fork assembly 124. As further depicted in FIG. 2A, the steerer tube 204 may include a control wire aperture 220 for passing a control wire from the handlebar assembly 108 through the steering column 104 and steerer tube 204 and out to the neck 136.

FIGS. 3A-3C depict a first example steering column clamp 120 shown in FIG. 1 in accordance with examples of the present disclosure. More specifically, and as illustrated in the top view 304 of the first example steering column clamp 120, the steering column clamp 120 may include an internal clamp portion 302 that includes the circumferential surface 308 and a longitudinal slot 324 in the circumferential surface 308 forming the first and second surfaces of the extension portions 314A and 314B. In examples, the steerer tube 204 (FIGS. 2A-2B) may extend through the hole 306 or otherwise be disposed in the internal clamp portion 302. Accordingly, one or more apertures may exist, such as apertures 312/312A/312B (FIG. 3B) disposed in the steering column clamp 120, that allow a bolt, which when tightened, causes the internal clamp portion 302 to compress the steerer tube 204.

The internal clamp portion 302 may compress about the steerer tube 204 or otherwise compress the steerer tube 204 in response to the bolt being tightened. The extension portions 314A and 314B may deform thereby causing a compressive force to be applied about the internal clamp portion 302 to the steerer tube 204. While a hollow portion 316 is depicted as existing between each of the extension portions 314A and 314B and an interior surface of the exterior wall portion 320, the extension portions 314A and/or 314B may be partially attached to an inner surface wall forming the hollow portion 316 in one or more locations. The exterior wall portion 320 may extend around one or more portions of the internal clamp portion 302, such as the extension portions 314A and 314B, thereby at least partially enclosing the inner clamp portion.

It should be understood that other tightening mechanisms may be utilized to clamp the steering column clamp to the steerer tube. For example, while one or more bolts were described as tightening the steering column clamp around the steerer tube, it should be understood that one or more of a different lever, different thread, different bolt and/or bolt pattern, and/or different clamping mechanism having different extension portions may be utilized.

FIG. 3B depicts a rear perspective view 322 of the first example steering column clamp 120 and FIG. 3C depicts a front perspective view 336 of the first example steering column clamp in accordance with examples of the present disclosure. As further depicted in FIG. 3B, a first aperture 312A may be coaxial with a first tapped aperture 340 (FIG. 3C) in the first extension portion 314A. A first aperture in the second extension portion 314B may also include a countersink feature (not shown). Likewise, the second aperture 312B may be coaxial with a second tapped aperture in the first extension portion 314A. The second aperture in the second extension portion 314B may also have a countersunk feature (not shown).

Accordingly, upon tightening a first bolt disposed in the first tapped aperture 340 and the first aperture having the countersink feature, the first and second extension portions 314A and 314B may compress thereby compressing the internal clamp portion 302. Similarly, upon tightening a second bolt disposed in the second tapped aperture and the second aperture having the countersink feature, the first and second extension portions 314A and 314B may compress thereby compressing the internal clamp portion 302.

The steering column clamp 120 may be formed of any material and by any manufacturing process. For example, portions of the steering column clamp 120 may be extruded and/or three-dimensionally printed and other portions may be machined. The steering column clamp 120 may have a front surface 328 that is inset from an outer or exterior surface 348. Stated differently, the steering column clamp 120 may include a front surface 328 that is recessed thereby forming a lip portion 344. The lip portion 344 may be configured to mate with a steering column 104 as depicted in FIGS. 1, 2, 5 and 7. Accordingly, an exterior surface of the steering column clamp 120 may be flush with an exterior surface of the steering column 104. For example, an exterior surface of the steering column clamp 120 may be coplanar with an exterior surface of the steering column 104. In some examples, the steering column clamp 120 may include a safety screw or clocking aperture 332 to accommodate a safety screw or clocking screw configured to maintain alignment and physical connection between the steering column 104 and the steerer tube 204 during an install process and/or for safety purposes.

FIGS. 4A-4C depict a second example steering column clamp 410 in accordance with examples of the present disclosure. More specifically, and as illustrated in the top view 404 of the second example steering column clamp 410, the steering column clamp 410 may include an internal clamp portion 402 that includes the circumferential surface 408 and a longitudinal slot 424 in the circumferential surface 408 forming the first and second surfaces of the extension portions 414A and 414B. In examples, the steerer tube 204 may extend through the hole 403 or otherwise be disposed in the internal clamp portion 402. One or more apertures may exist, such as apertures 412/412A/412B/412C disposed in the steering column clamp 410, that allow access to a bolt. When the bolt is tightened, the internal clamp portion 402 compresses the steerer tube 204. That is, the internal clamp portion 402 may compress about the steerer tube 204 or otherwise compress the steerer tube 204. The extension portions 414A and 414B may deform thereby causing a compressive force to be applied about the internal clamp portion 402 to the steerer tube 204.

While a hollow portion 416 is depicted as existing between each of the extension portions 414A and 414B and an interior surface of the exterior wall portion 420, the extension portions 414A and/or 414B may be partially attached to an inner surface wall forming the hollow portion 416 in one or more locations. The exterior wall portion 420 may extend around one or more portions of the internal clamp portion 402, such as the extension portions 414A and 414B, thereby at least partially enclosing the inner clamp portion. By partially enclosing the inner clamp portion, weather elements such as rain, snow, and sun may be prevented from interfering with the operation of the steering column clamp, steering column, and/or head tube.

FIG. 4B depicts a rear perspective view 422 of the second example steering column clamp 410 and FIG. 4C depicts a front perspective view 436 of the second example steering column clamp in accordance with examples of the present disclosure. As further depicted in FIG. 4B, a first aperture 412A may be coaxial with a first tapped aperture in the first extension portion 414A (not shown). In some examples, a first aperture in the second extension portion 414B may have a countersink feature (not shown). The second aperture 412B may be coaxial with a second tapped aperture in the first extension portion 414A. The second aperture in the second extension portion 414B may also have a countersunk feature (not shown).

The third aperture 412C may be coaxial with a third tapped aperture in the first extension portion 414A. The third aperture in the second extension portion 414B may also a countersunk feature (not shown). Accordingly, upon tightening a first bolt disposed in the first tapped aperture and the first aperture having the countersink feature, the first and second extension portions 414A and 414B may compress thereby compressing the internal clamp portion 302. Similarly, upon tightening a second and third bolt disposed in the second tapped aperture, and the second aperture having the countersink feature, and the third aperture having the countersink feature, the first and second extension portions 414A and 414B may compress thereby compressing the internal clamp portion 402.

Similar to the steering column clamp 120, the steering column clamp 410 may be formed of any material and by any manufacturing process. For example, portions of the steering column clamp 410 may be extruded and/or three-dimensionally printed and other portions may be machined. The steering column clamp 410 may have a front surface 428 that is inset from an outer or exterior surface 448. Stated differently, the steering column clamp 410 may include a front surface 428 that is recessed thereby forming a lip portion 444. The lip portion 444 may be configured to mate with a steering column 104 as depicted in FIGS. 1, 2, 5 and 7. Accordingly, an exterior surface of the steering column clamp 410 may be flush with an exterior surface of the steering column 104. Stated another way, an exterior surface of the steering column clamp 410 may be coplanar with an exterior surface of the steering column 104. In some examples, the steering column clamp 410 may include a plurality of safety screw or clocking apertures 432A (also shown as 432 in FIG. 4B) and 432B to accommodate one or more safety screws or clocking screws configured to maintain alignment and physical connection between the steering column 104 and the steerer tube 204 during an install process and/or for safety purposes.

FIGS. 5A-5C depict a third example steering column clamp 510. FIG. 5A illustrates an exploded perspective view 504 of the steering column clamp 510 together with the steering column 104 in accordance with examples of the present disclosure. The steering column clamp 510 may be similar to the steering column clamp 120 and steering column clamp 410 previously described.

At least one difference between the steering column clamp 510 and the steering column clamp 120/410 is that the steering column clamp 510 utilizes bolts from different sides of the steering column clamp 510 to impart the compressing force at an inner clamp portion and longitudinal slot 524. That is, a first bolt 516A may be disposed through a first aperture 512A to contact a tapped aperture portion 522A and aperture with countersink 518A. A second bolt 516B may be disposed through a second aperture 512B to contact a tapped aperture portion 522B and aperture with countersink 518B. A third bolt 516C may be disposed through a first aperture 512C to contact a tapped aperture portion 522C and aperture with countersink 518C. Thus, when each of the bolts 516A-516C are tightened, a compressing force between extension portions 514A and 514B within the steering column clamp 510 may cause the steering column clamp 510 to clamp tight against an inserted steerer tube 204.

FIG. 5C depicts a perspective assembled view 508 of a steering column 104 and steering column clamp 510 in accordance with examples of the present disclosure. An opening in the steering column 104 as depicted in FIG. 5A may be configured to receive the steering column clamp 510 such that the steering column clamp 510 mates with the steering column 104.

Accordingly, one or more external surfaces of the steering column clamp 510 and the steering column 104 may be flush. The joint between the steering column 104 and the steering column clamp 510 may be welded.

FIG. 6A depicts a side view 604 of the steering column 104 and FIG. 6B depicts a top view 608 of the steering column 104 in accordance with examples of the present disclosure. The steering column 104 may be extruded, three-dimensionally printed, and/or created using any other manufacturing techniques. The steering column 104 is generally hollow and may include a taper portion having an opening configured to receive the steering column clamp 120 for example. FIG. 6C depicts a perspective view 612 of the head tube 116 and FIG. 6D depicts a top view 616 of the head tube 116 in accordance with examples of the present disclosure. The head tube 116 is generally hollow and includes openings at the top end 620A and at the bottom end 620B for receiving the steerer tube 204 such that the steerer tube 204 passes through the head tube 116. As further depicted in FIG. 6C, a control wire aperture 624 may exist to pass a control wire from the steerer tube 204 to the neck 136. Accordingly, the neck 136 may cover the control wire aperture 624. In some examples, the head tube 116 may be solid but for the wire aperture 624 and the opening 620. In some examples, the head tube 116 may include a safety screw or clocking apertures similar to those described above at, near or otherwise integrated with the openings 620 at the top end 620A and/or at the bottom end 620B.

FIGS. 7A and 7B depict additional details of the neck 136, control wire aperture 220 and the control wire aperture 624 in FIG. 6C in accordance with examples of the present disclosure. More specifically, as the steering column 104 may pivot or rotate during normal use (shown by 708 in FIG. 7B), the control wire aperture 220 in combination with the control wire aperture 624 allows the control wires passing from the handlebar assembly 108 (FIG. 1) through the steering column 104 to be completely concealed within the head tube 116 (FIG. 1) and neck 136. Moreover, the control wires are not subjected to twisting and turning motions that may be experienced if the control wires were directly attached to an external surface of the steering column 104 and neck 136 for example.

As depicted by 704 in FIG. 7A, the control wire aperture 220 is aligned with the control wire aperture 624. When the steering column 104 and hence the steerer tube 204 is rotated, such as that which is depicted by 708 in FIG. 7B, the control wire aperture 220 may not be aligned with the control wire aperture 624; however, one or more control wires may still pace from the steerer tube 204 to the neck 136 through the head tube 116.

FIG. 8 depicts a top, right side, left side, front, back, cross-section (shown by line B-B), and perspective view of the steering column in accordance with examples of the present disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A scooter steering assembly comprising:
a handlebar assembly including one or more handlebars;

a steering column clamp having an internal clamp portion; and a steering column disposed between the handlebar assembly and the steering column clamp, wherein a tightening mechanism, when engaged, causes the internal clamp portion to compress about a steerer tube, wherein the handlebar assembly is fixedly attached to the steering column, and the steering column is fixedly attached to the steering column clamp, and wherein an outer surface of the steering column is substantially coplanar with an outer surface of the steering column clamp.

2. The scooter steering assembly of claim 1, wherein an opening at a first end of the steering column is configured to mate with a first end of the steering column clamp.

3. The scooter steering assembly of claim 1, wherein the internal clamp portion includes a longitudinal slot disposed at least partially between a first end of the internal clamp portion and a second end of the internal clamp portion.

4. The scooter steering assembly of claim 3, wherein the longitudinal slot extends to at least one of the first end of the internal clamp portion and the second end of the internal clamp portion.

5. The scooter steering assembly of claim 3, wherein the steering column clamp includes a hollow portion between the internal clamp portion and an internal surface of an exterior wall portion of the steering column clamp.

6. The scooter steering assembly of claim 5, wherein the hollow portion is between the longitudinal slot and the internal surface.

7. The scooter steering assembly of claim 1, further comprising:

a head tube disposed between the steering column clamp and a front fork assembly including the steerer tube, wherein the steerer tube includes an aperture coupling a hollow space in the head tube to a hollow space inside the steerer tube, and wherein the front fork assembly and the steering column clamp rotate with respect to the head tube.

8. The scooter steering assembly of claim 7, wherein the hollow space in the steerer tube and the hollow space in the head tube are both configured to house an electrical cable.

9. The scooter steering assembly of claim 1, wherein an outer surface of the steerer tube is in contact with an inner surface of the internal clamp portion.

10. An electric scooter including the scooter steering assembly of claim 1.

11. A method of securing a handlebar assembly, the method comprising:

fixedly attaching a first end of a steering column clamp to an opening at a first end of a steering column, wherein a tightening mechanism, when engaged, causes an internal clamp portion to compress about a steerer tube; and fixedly attaching a second end of the steering column to the handlebar assembly, wherein an outer surface of the steering column is substantially coplanar with an outer surface of the steering column clamp.

* * * * *